United States Patent [19]

Lüssi et al.

[11] Patent Number: 5,333,537
[45] Date of Patent: Aug. 2, 1994

[54] DEVICE FOR EJECTION OF GROUND COFFEE PRESSED INTO A CAKE FROM A BREWING APPARATUS OF A COFFEE MACHINE

[75] Inventors: André Lüssi; Hans Zurbuchen, both of Wabern; Jürg von Gunten, Grosshöchstetten, all of Switzerland

[73] Assignee: Sintra Holding AG, Switzerland

[21] Appl. No.: 30,315

[22] PCT Filed: Jul. 28, 1992

[86] PCT No.: PCT/CH92/00156
§ 371 Date: Mar. 24, 1993
§ 102(e) Date: Mar. 24, 1993

[87] PCT Pub. No.: WO93/02606
PCT Pub. Date: Feb. 18, 1993

[30] Foreign Application Priority Data

Jul. 30, 1991 [CH] Switzerland .................. 02 283/91-7

[51] Int. Cl.⁵ .................. A47J 31/34; A47J 31/00
[52] U.S. Cl. .................. 99/287; 99/289 R
[58] Field of Search .................. 99/289 R, 287, 297, 99/302 R, 302 P; 416/433

[56] References Cited

U.S. PATENT DOCUMENTS

| | | |
|---|---|---|
| 3,369,478 | 2/1968 | Black . |
| 3,760,712 | 9/1973 | Rossi .................. 99/289 R |
| 4,457,216 | 7/1984 | Dremmel .................. 99/287 |
| 5,230,277 | 7/1993 | Bianco .................. 99/287 |

FOREIGN PATENT DOCUMENTS

| | | |
|---|---|---|
| 1217198 | 4/1987 | European Pat. Off. . |
| 3298547 | 1/1989 | European Pat. Off. . |
| 900565 | 7/1990 | Fed. Rep. of Germany . |
| 1400241 | 5/1991 | Fed. Rep. of Germany . |
| 256278 | 10/1985 | France . |

*Primary Examiner*—Robert W. Jenkins
*Attorney, Agent, or Firm*—Pearne, Gordon, McCoy & Granger

[57] ABSTRACT

An ejection device includes an ejection part (17) which is swivelingly fastened to a brewing cylinder (9) displaceably disposed along a parallel driving spindle (6), and a nose (22) disposed on a sidewall (2) of a frame (1). Mounted within and closing a cylindrical bore of the brewing cylinder are first and second pistons. The second piston (8) is, upon a downwardly movement of the brewing cylinder (9) away from the first piston, displaceable to a first or upper end of the brewing cylinder. Ground coffee (40) pressed into a cake is conveyed out of the brewing cylinder (9) during this displacement movement and rests upon a cambered end face (42) of the second piston (8). The ejection part (17) includes two rocking levers (18, 19) which extend at the sides of the brewing cylinder (9) longitudinally thereto and are swivelingly mounted in a lower region of the brewing cylinder (9) about a swivel axis (23). Ends of the rocking levers (18, 19) remote from the swivel axis are connected to an ejection plate (20). One of the rocking levers has an L-shaped extension (21) which co-operates with the nose (22) as an actuating means for swinging out the ejection part (17). Because both the first or upper end (41) of the brewing cylinder (9) and the end face (42) of the second piston (8) are curved and adapted to one another in such a way that a sliding surface (50) of the ejection plate (20) sweeps the faces (41, 42) practically completely upon the swinging-out of the ejection part (17), the cake is stripped without leaving behind any substantial ground coffee residue.

10 Claims, 6 Drawing Sheets

DEVICE FOR EJECTION OF GROUND COFFEE PRESSED INTO A CAKE FROM A BREWING APPARATUS OF A COFFEE MACHINE

BACKGROUND OF THE INVENTION

The present invention relates to a device for the ejection of ground coffee pressed into a cake from a brewing apparatus of a coffee machine comprising an ejection part which is swivelingly fastened to a brewing cylinder.

The preparation of coffee by means of coffee machines is carried out according to different processes which may be separated into two basic types. A first type of process, in which the hot water runs through the ground coffee in a filter solely owing to gravity, is distinguished from a second type of process, in which the hot water is conveyed through the ground coffee under pressure (espresso or pressure-brewing process). The present invention relates particularly to the last-mentioned pressure-brewing process. For carrying out this process automatically, various coffee machines are known in the art. There are those in which, at the end of a brewing operation, the leached-out ground coffee is pressed into a cake which must thereafter be removed from the brewing apparatus. For that purpose, the cake of ground coffee is first conveyed to one end of the brewing cylinder by means of a piston disposed in the brewing cylinder, longitudinally displaceable relative to the latter. A device for ejection is then actuated in order to strip the cake of ground coffee off the face of the piston and remove it from the brewing apparatus.

It is essential that the cake of ground coffee often adhering to the end surface of the piston, which is customarily provided with a strainer, is removed as completely as possible. In order to reach this goal, more or less expensively designed ejection devices have already become known. It is often necessary to assist the complete removal of the cake of ground coffee by means of a stream of water or by means of a brush.

In the French patent application published under the number FR 2 562 782, an ejection device is disclosed which is very simply constructed. A bent two-armed lever is mounted swivelingly on the frame of a coffee machine. One of the lever arms has at its end a stripper sheet which can be led over the top of the brewing cylinder upon swiveling of the lever. The other lever arm enters into contact with the rods of a crank assembly whenever the swiveling movement is supposed to be carried out. What is disadvantageous about the disclosed ejection device is that the stripper plate describes a circular orbit over the flat brewing-cylinder end having a radius which substantially corresponds to the length of the one lever. The space between the stripper plate and the flat face, provided with a strainer, of the piston at the end of the brewing cylinder is variable during the stripping operation of the cake of ground coffee. Depending upon the adhesion of the cake of ground coffee to the strainer, it will be removed entirely or only partially.

Because the crank assembly is the drive element, the disclosed coffee machine is likewise not suitable for processing varying amounts of ground coffee which is demanded of new coffee machines. Known ejection devices in coffee machines which process varying amounts of coffee are, however, of more complicated construction than the one just described.

SUMMARY OF THE INVENTION

It is the task of the present invention to create a simply designed device for the ejection of ground coffee pressed into a cake from a brewing apparatus of a coffee machine, by means of which the cake of ground coffee can be completely removed from the brewing apparatus. The brewing apparatus is intended particularly for coffee machines designed for processing varying amounts of ground coffee.

The solution of this problem takes place by means of an ejection device which has the features recited in the characterizing clause of patent claim 1.

Advantageous designs as well as preferred embodiments of the ejection devices according to the invention include the features of the dependent patent claims.

BRIEF DESCRIPTION OF THE DRAWINGS

By means of figures, the invention shall be explained below in more detail by way of example.

DETAILED DESCRIPTION OF THE PREFERRED EMBODIMENT

Figure 1:
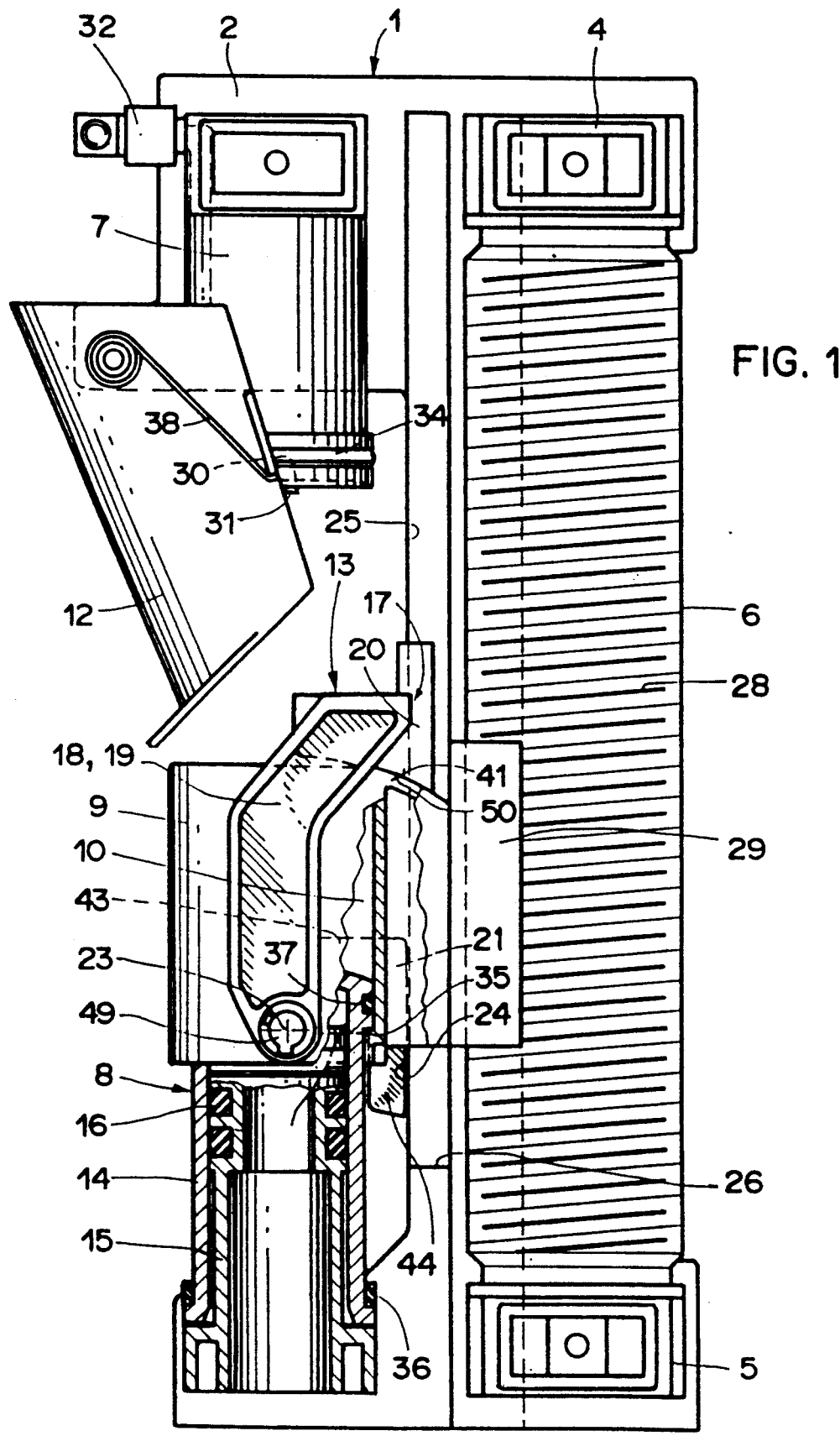
FIG. 1 shows a partial longitudinal section, viewed from the side, through a brewing apparatus depicted in the filling position having an ejection device according to the invention.
Figure 2:
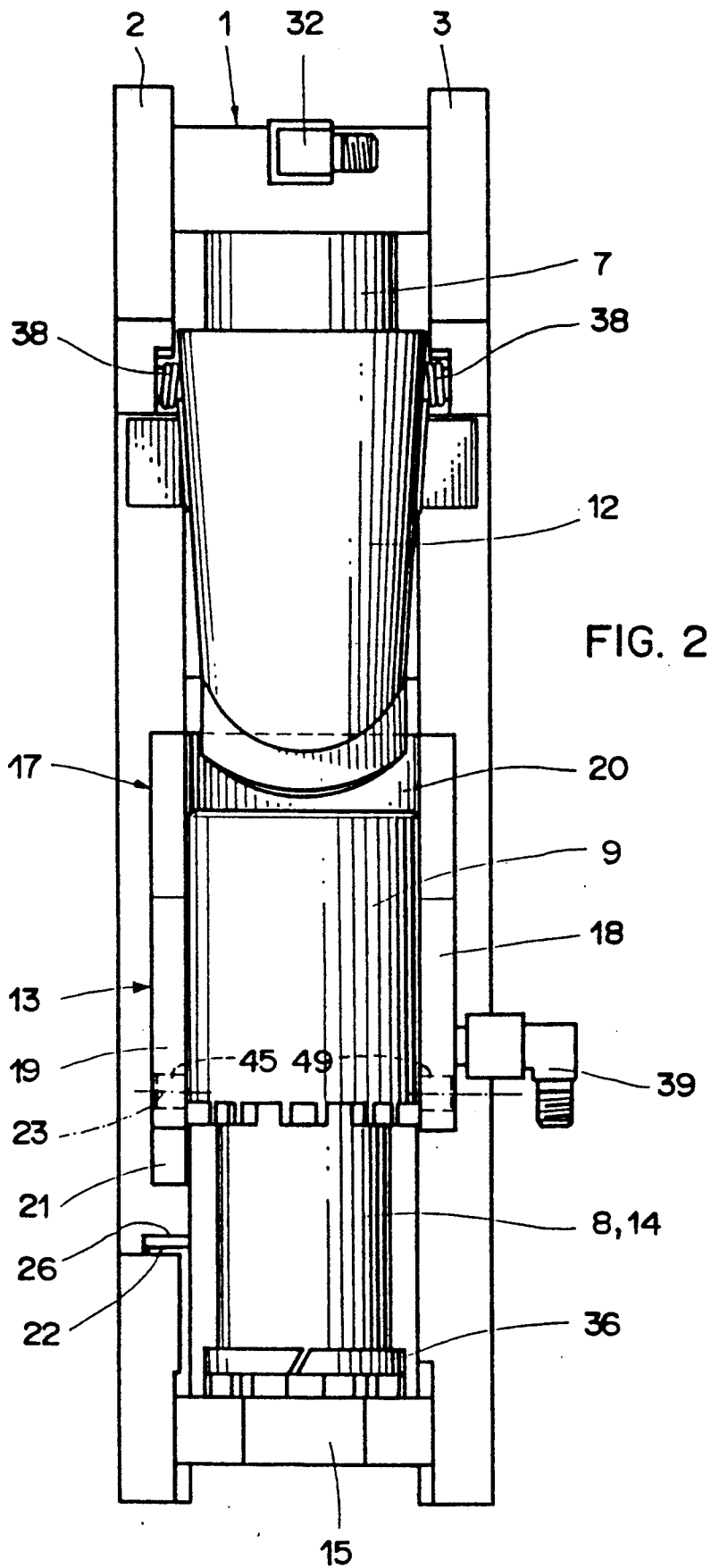
FIG. 2 shows a front view of the brewing apparatus shown in FIG. 1.

FIGS. 1 and 2 show a brewing apparatus for a coffee machine in a partial longitudinal section viewed from the side (FIG. 1) and in a front view (FIG. 2), each in the resting or filling position. In the figures, the essential functional components of the brewing apparatus, as well as the ejection device according to the invention, are depicted. The brewing apparatus comprises a frame 1 which is substantially formed by a first and a second sidewall 2, 3, which sidewalls are spaced from one another by appropriate spacing means. Used as spacing means are, among other things, an upper and a lower spindle bearing 4, 5 of a driving spindle 6 extending longitudinally over the entire apparatus. This spindle is rotatingly mounted in the spindle bearings and secured against axial displacement. Applied to the driving spindle 6 is a preferably multiple spindle thread 28. Spaced from the vertical driving spindle 6 is a brewing cylinder 9 held displaceably longitudinally to the former. The brewing cylinder 9 has a through bore 10, the axis of which runs parallel to the axis of the driving spindle 6. Fixed to the brewing cylinder is a follower part 29 which extends toward the driving spindle. The follower part is made substantially plate-shaped and has a side facing the driving spindle 6 forming partial thread courses which engage the spindle thread 28. The follower part is guided laterally by guide means not shown. Through the turning of the driving spindle 6 in one direction or the other, the brewing cylinder 9 is displaced upward or downward.

Fixed to the frame 1 is a first or upper piston 7. A face of the upper piston 7 turned toward the brewing cylinder 9 is provided with a dismountable strainer 30 which is held by means of a fastening clip 31. A gasket 34 is intended to seal the upper piston 7 fluid-tightly relative to the inside wall of the bore 10 of the brewing cylinder 9. A connection fitting 32 disposed on the upper piston is intended for discharging the coffee. The connection fitting 32 is connected via a line 33 to the side of the strainer 30 facing the brewing cylinder 9. The end of the upper piston 7 closer to the connection fitting 32 is laterally widened and serves to keep the two said sidewalls 2, 3 spaced.

Disposed in the bore 10 of the brewing cylinder 9 is a second or lower piston 8 which is displaceable substantially along the whole brewing cylinder 9. The lower piston 8 has a cambered end face 42 and a hollow-cylindrical shank 14 which extends downwardly from the brewing cylinder 9. The displacement movement of the lower piston 8 within the bore 10 of the brewing cylinder 9 is bounded by upper stop means 35 and by lower stop means 36 which are at the top and the bottom end, respectively, of the shank 14. The lower piston 8 likewise has a gasket 37 intended to seal the lower piston 8 fluid-tightly relative to the inside wall of the bore 10 of the brewing cylinder 9. Coaxial with the bore 10, hence with the lower piston 8, there is a hollow-cylindrical connecting piece 15. The connecting piece is end facing the brewing cylinder 9 is laterally widened and likewise serves as spacing means for the already mentioned sidewalls 2, 3. The hollow-cylindrical shank 14 of the lower piston 8 is slidable over the connecting piece 15. O-rings 16, which are positioned on the connecting piece in corresponding grooves, ensure that the displacement movement of the lower piston 8 relative to the connecting piece 5 is inhibited or braked.

A second connection fitting 39 serves to feed hot, pressurized water into the bore 10 of the brewing cylinder 9.

Swivelingly mounted in the upper end region between the two sidewalls 2, 3 is a hopper 12 for pouring ground coffee into the brewing cylinder 9. Springs 38 ensure the retracted resting position of the hopper 12.

In the filling position shown in FIGS. 1 and 2, the first or upper end 41 of the brewing cylinder 9 is spaced from the face of the upper piston 7 facing the brewing cylinder 9.

The device according to the invention for the ejection of ground coffee pressed into a cake from the brewing apparatus is designated as 13. The device comprises an ejection part 17 which is swivelingly fastened to the brewing cylinder 9, as well as a nose 22 which is disposed in the lower end region of the first sidewall 2 of the frame 1. The ejection part 17 comprises two rocking levers 18, 19 which extend at each side of the brewing cylinder 9 substantially longitudinally thereto. They are each swivelingly mounted on a pivot pin 49, which each extend horizontally outwardly from a lower end region of the brewing cylinder 9. A swivel axis, which runs at right angles to the axis of the brewing cylinder 9, is marked by the reference numeral 23. A preferred embodiment provides that the swivel axis 23 intersects the axis of the brewing cylinder 9.

The ends of the rocking levers 18, 19 remote from the swivel axis 23 are connected to one another via an ejection plate 20. This plate extends at right angles to the rocking levers over the top 41 of the brewing cylinder 9. A sliding surface 50 of the ejection plate 20 facing the end of the brewing cylinder 9 has a curvature which corresponds to the swivel radius. The top 41 of the brewing cylinder 9 has an equally large curvature.

Disposed on one of the rocking levers 19, which is not visible in FIG. 1, in the region of the swivel axis 23, is a first actuating means 21. The first actuating means 21 comprises, among other things, a first locking means which consists substantially of an L-shaped extension. A first leg 43 of the extension 21 runs substantially at right angles to rocking lever 19. Disposed at an end of the first leg 43 remote from the one rocking lever 19 is a second leg 44 extending substantially parallel to the rocking lever 19. A downwardly facing surface of the first leg 43 is designated by the reference numeral 45 as an actuating surface. The actuating surface 45 is intended to cooperate with the nose 22 as a second actuating means. The side of the second leg 44 remote from the one rocking lever 19 is hereafter called locking surface 24. In those positions of the brewing cylinder 9 in which swinging-out of the ejection part 17 from the position shown in FIG. 1 is not provided for, the locking surface 24 slides substantially snugly along a stop path 25, which forms a second locking means. Swinging-out of the ejection part 17 is thereby prevented. Swinging-out of the ejecting part 17 is possible only when the locking surface 24 at least partially extends downwardly beyond a bottom 26 of the stop path 25.

Now that the most essential components of the brewing apparatus, on the one hand, and particularly of the ejection device according to the invention, on the other hand, have been described, the mode of functioning of the latter is explained below.

For that purpose, we start from the filling position depicted in FIG. 1. A certain amount of ground coffee is poured into the bore 10 of the brewing cylinder 9 through the hopper 12. The ejection part 17 is in a retracted position. It is prevented from swinging out by the locking surface 24 which rests against the stop path 25. The driving spindle 6 is rotated in such a way that the follower part 29 is displaced upward with the brewing cylinder 9. The lower piston 8 is at the same time dragged along by the upper stop means 35.

Figure 3:
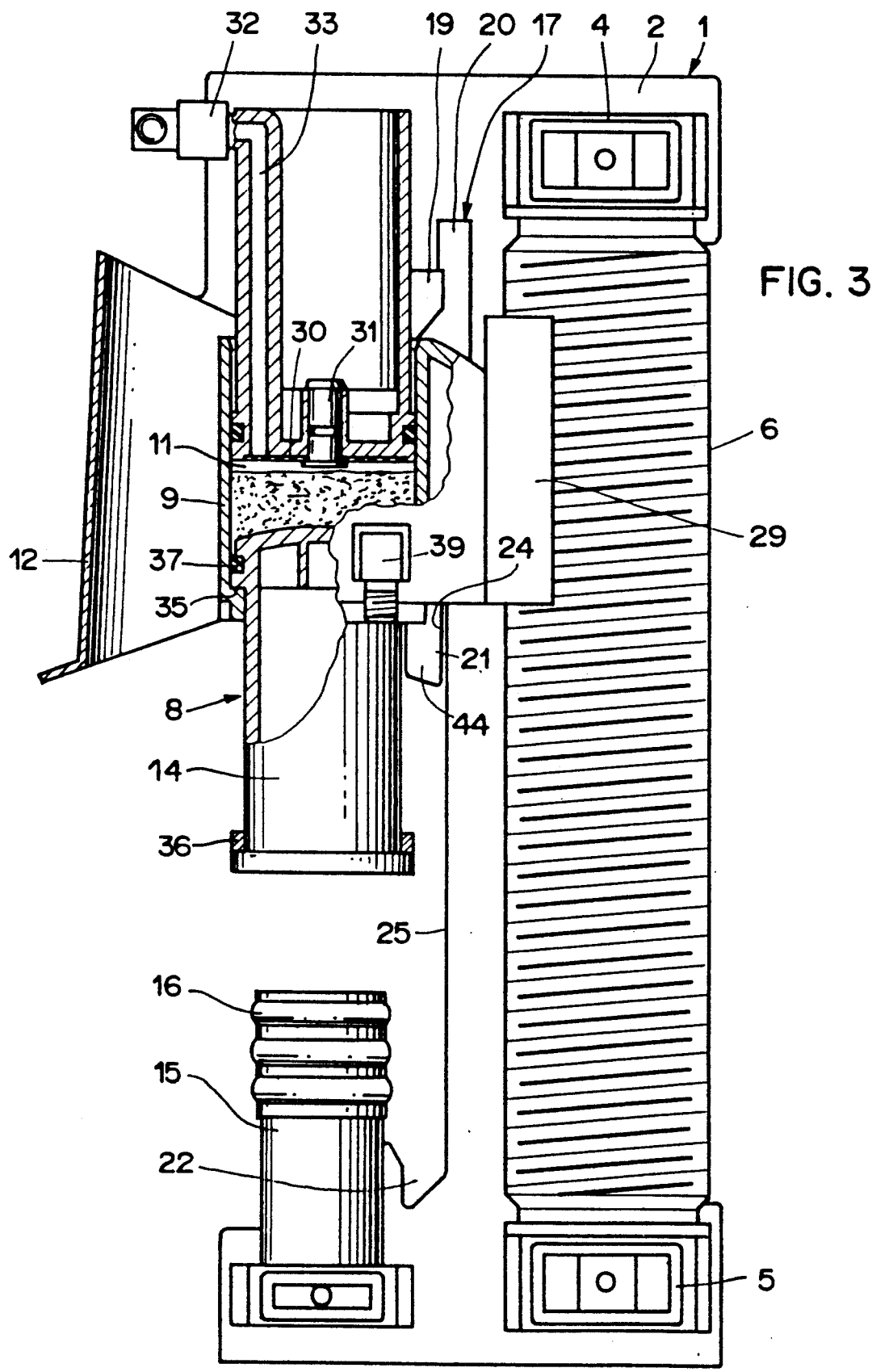
FIG. 3 shows a partial longitudinal section, viewed from the side, through the brewing apparatus in the brewing position.

The first or upper end of the brewing cylinder 9, upon continued upward movement of the latter, is pushed over the upper piston 7. Within the brewing cylinder, the brewing chamber 11 is thereby formed. After the upward movement has been stopped, pressurized hot water reaches the brewing chamber 11 via the second connection fitting 39. The ground coffee is flushed through with the water, during which coffee is produced, which leaves the brewing apparatus through the strainer 30 via the line 33 and the first connection fitting 32. This briefly describes the brewing position depicted in FIG. 3. It is to be heeded in this connection that in this position, the shank 14 of the lower cylinder 8 has been lifted off the connecting piece 15. The hopper 12 has been swiveled outward during the upward movement of the brewing cylinder 9.

Figure 4:
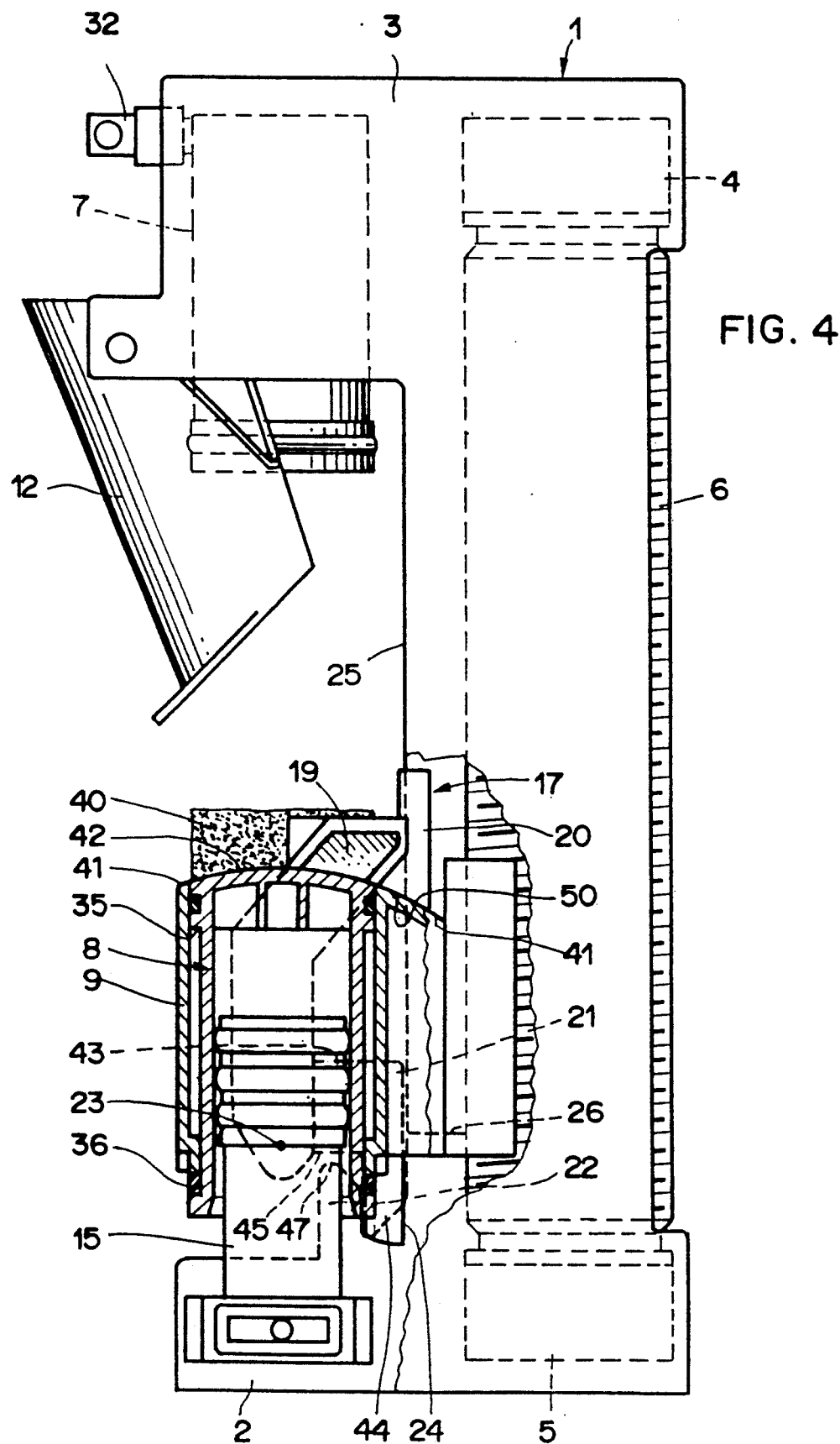
FIG. 4 shows a partial longitudinal section, viewed from the side, through the brewing apparatus in a position shortly before the activation of the ejection device.
Figure 5:
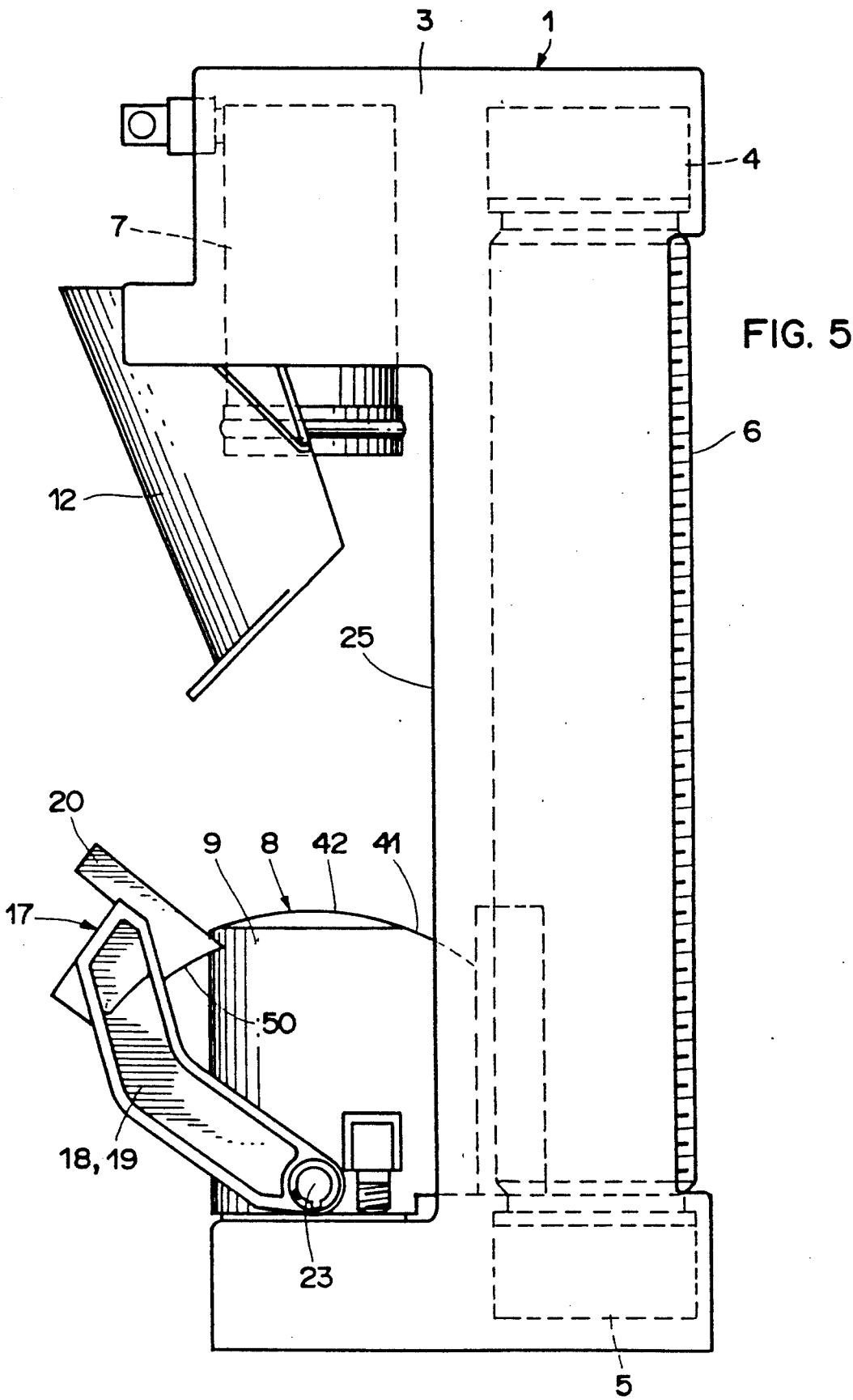
FIG. 5 shows a partial longitudinal section, viewed from the side, through the brewing apparatus with ejection means swung out.
Figure 6:
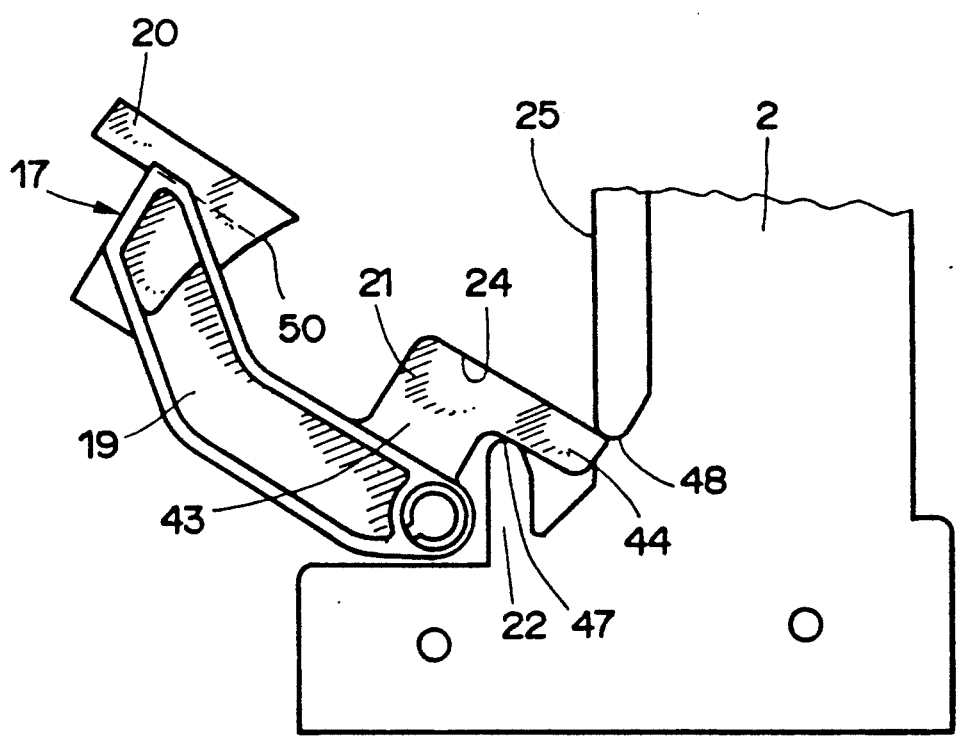
FIG. 6 shows the ejection device of FIG. 5, depicted without the brewing cylinder, piston, and spindle.

After the leached-out ground coffee has been pressed out, the driving spindle 6 is once more rotated—this time in the opposite direction—whereby the brewing cylinder 9 is moved downwardly. The lower piston 8 at first remains in the position shown in FIG. 3 within the brewing cylinder 9. This as a result of the friction of the gasket 37 and of the adhesion of the ground coffee pressed into a cake 40. At some time during the course of the downwardly movement of the brewing cylinder 9, the bottom of the shank 14 runs into the top of the connecting piece 15. At the same time, the O-rings 16, as a result of their rubbing action, inhibit or slow the downwardly directed movement of the lower piston 8 relative to the downwardly movement of the brewing cylinder 9. A relative upwardly movement of the lower piston 8 within the bore 10 relative to the brewing cylinder 9 is thereby produced. Upon continued downwardly movement of the brewing cylinder 9, a position substantially depicted in FIG. 4 is reached. The upwardly curved end face 42 of the lower piston 8 is thus flush at its edge with the likewise curved top 41 of the brewing cylinder 9. The cake of ground coffee 40 rests on the end face 42. The cake of ground coffee is completely outside of the brewing cylinder 9. This position is reached before the actuating surface 45 of the first leg 43 hits an upwardly directed end 47 of the nose 22. At that time, the locking surface 24 of the second leg 44 at least partially extends downwardly beyond the bottom 26 of the stop path 25. In the position shown in FIG. 4, the lower stop means 36 now becomes effective. The lower piston 8 can no longer be further displaced upward relative to the brewing cylinder 9. During the further downward movement of the brewing cylinder 9, the speed of movement of the lower piston 8 is again equal to that of the brewing cylinder 9. The actuating surface 45 of the first leg 43 finally comes in contact with the top 47 of the nose 22. Through the further downward movement, the ejection part 17 is thereby swiveled outwardly, as is depicted in FIGS. 5 and 6.

The cake of ground coffee has been cleanly removed from the cambered end face 42 of the lower piston 8. Due to the fact that not only does the top 41 of the brewing cylinder 9 have a curvature corresponding to a path which is described by the sliding surface 50 of the ejection plate 20 during swinging-out of the ejection part 17, but also because the cambered end face 42 of the lower piston 8 follows this path as well. The sliding surface 50 slides over the end face 42 substantially without any clearance worth mentioning, practically no ground coffee residue is left behind on the end face 42 of the lower piston 8. Further cleaning is unnecessary.

Retraction of the ejection part 17 into the resting position takes place in that during the subsequent upwardly movement of the brewing cylinder 9, a bottom end 48 of the stop path 25 presses upon the locking surface 24 as a further actuating means, whereby the ejection part 17 is retracted, and the locking surface 24 finally again comes substantially to rest adjacent to the stop path 25. The filling position described in FIG. 1 is again reached. The nose 22 and the stop path 25 run in the longitudinal direction of the brewing apparatus staggered parallel to one another. The top 47 of the nose does not then overlap the bottom end 48 of the stop path 25.

In conclusion, let it be mentioned that by means of the brewing apparatus shown, which is driven without a crank assembly, it is readily possible to process different amounts of ground coffee. The brewing cylinder 9 need merely be moved upwardly varying amounts for that purpose.

What is claimed is:

1. Device for ejection of ground coffee pressed into a cake from a brewing apparatus of a coffee machine having a frame for supporting said brewing apparatus, a brewing cylinder having a cylindrical bore and a first end, first and second pistons mounted within and closing the cylindrical bore to form a brewing chamber, said brewing cylinder and said second piston being displaceable relative to one another and said first piston along a brewing cylinder axis, said first piston being fixed to said frame, a drive spindle for displacing said brewing cylinder away from said first piston to space said first end of the brewing cylinder from a face of said first piston facing the brewing cylinder a distance equal to at least a thickness of said cake of ground coffee, and means for displacing said second piston toward said brewing cylinder at least until a face of said second piston facing said brewing cylinder is flush with said first end of the brewing cylinder for ejecting said cake of ground coffee out of said brewing cylinder, wherein said device comprises an ejection part disposed on said brewing cylinder and means for swiveling said ejection part about a swivel axis at right angles to said brewing cylinder axis and spaced from said first end of the brewing cylinder to eject said cake of ground coffee off of said face of said second piston, and wherein said first end of the brewing cylinder and said face of said second piston have a curvature corresponding to a swiveling path described by said ejection part.

2. Device according to claim 1, wherein said swivel axis (23) intersects the brewing cylinder axis.

3. Device according to claim 2 or 1, further comprising means (21, 22) for actuating the ejection part (17) when the second piston (8) is displaced into a region of the first end (41) of the brewing cylinder (9), and locking means (24, 25) for preventing a swinging-out of the ejection part (17) outside of said region.

4. Device according to claim 3, wherein said ejection part comprises at least one rocking lever which extends from the swivel axis to the first end of the brewing cylinder, and said actuating means (21) and said locking means (14) comprise a substantially L-shaped extending disposed on the rocking lever (19) near the swivel axis (23) and having first and second legs, said first leg (43) of the extension (21) extending substantially at right angles to the rocking lever (19) and having an actuating surface (45), said second leg (44) of the extension being disposed at an end of the first leg (43) remote from the rocking lever (19) and extending substantially parallel to the rocking lever (19) and having a locking surface (24).

5. Device according to claim 4, wherein said actuating means further comprises a nose disposed on the frame (1) substantially parallel to the second leg (44) and toward the actuating surface (45) of the first leg (43) and is adapted for swinging-out the ejection part (17).

6. Device according to claim 5, wherein said locking means further comprises a stop path (25) extending along the frame (1) and parallel to the brewing cylinder axis for substantially a length of a displacement range of the brewing cylinder (9) and wherein the locking surface (24) of the second leg (44) slides along the stop path (25) substantially snugly during displacement of said brewing cylinder for preventing swinging-out of the ejection part (17).

7. Device according to claim 6, wherein said stop path (25) runs parallel to the nose (12) and is spaced therefrom, and wherein an end (47) of the nose (22) facing the stop path (25) and an end (48) of the stop path (25) facing the nose (22) do not overlap.

8. Device according to claim 7, wherein said end (48) of the stop path (25) is adapted for retracting a swung-out ejection part (17).

9. Device according to claim 1, wherein said ejection part (17) comprises at least one rocking lever (18, 19) which extends from the swivel axis (23) to the first end (41) of the brewing cylinder (9), and an ejection plate disposed at an end of the rocking lever (18, 19) remote from the swivel axis (23) and which extends over the brewing cylinder (9) at right angles to the rocking lever (18, 19) for a distance substantially corresponding to a diameter of the bore (10) of the brewing cylinder (9).

10. Device according to claim 9, wherein said face of the second piston is cambered and has a camber radius substantially corresponding to a swivel radius of a side (50) of the ejection plate (20) facing the second piston.

* * * * *